March 6, 1956     R. W. DOWLING     2,737,081
PICTURE PROJECTION SYSTEM FOR PROJECTING MOTION PICTURES
Filed Feb. 2, 1954     5 Sheets-Sheet 1

FIG. I

INVENTOR.
Robert Whittle Dowling
BY
ATTORNEYS

March 6, 1956     R. W. DOWLING     2,737,081
PICTURE PROJECTION SYSTEM FOR PROJECTING MOTION PICTURES
Filed Feb. 2, 1954     5 Sheets-Sheet 2

INVENTOR.
Robert Whittle Dowling
BY
ATTORNEYS

March 6, 1956 R. W. DOWLING 2,737,081
PICTURE PROJECTION SYSTEM FOR PROJECTING MOTION PICTURES
Filed Feb. 2, 1954 5 Sheets-Sheet 3
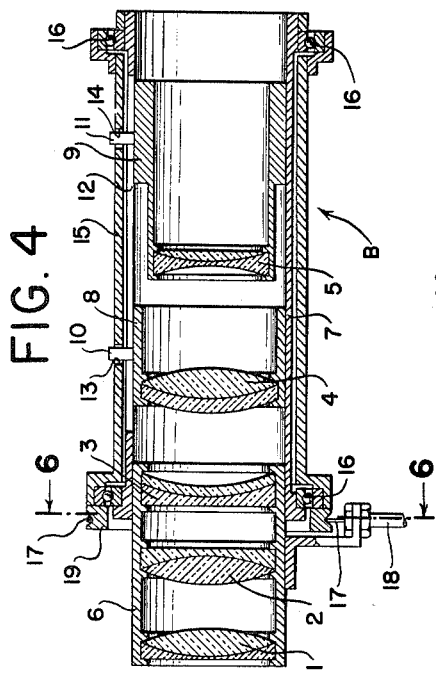
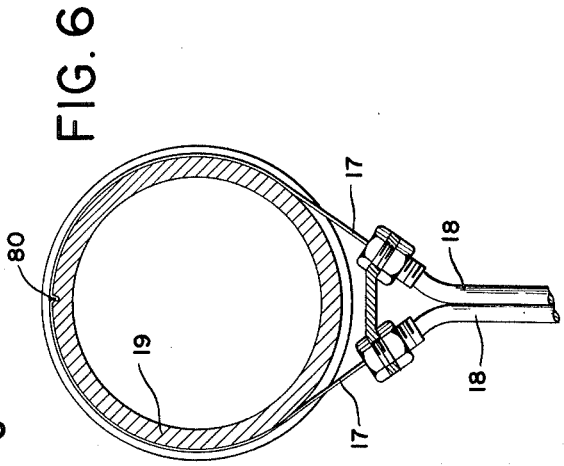
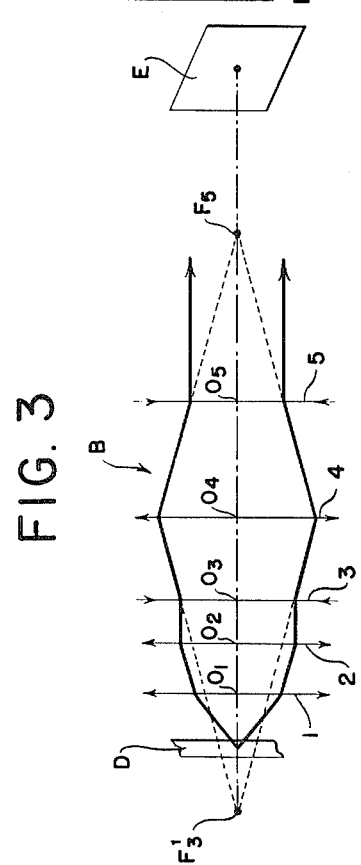
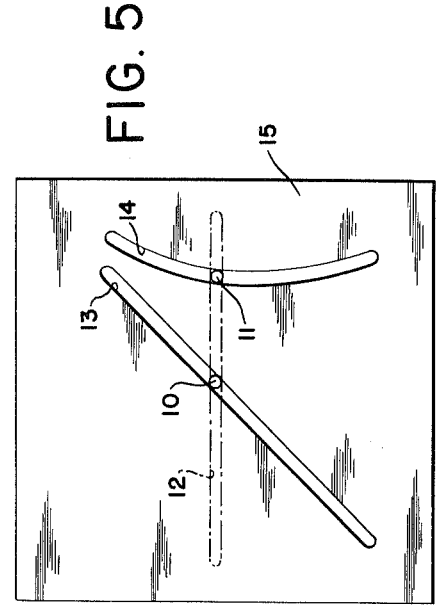
INVENTOR.
Robert Whittle Dowling
BY
ATTORNEYS March 6, 1956 R. W. DOWLING 2,737,081
PICTURE PROJECTION SYSTEM FOR PROJECTING MOTION PICTURES
Filed Feb. 2, 1954 5 Sheets-Sheet 4
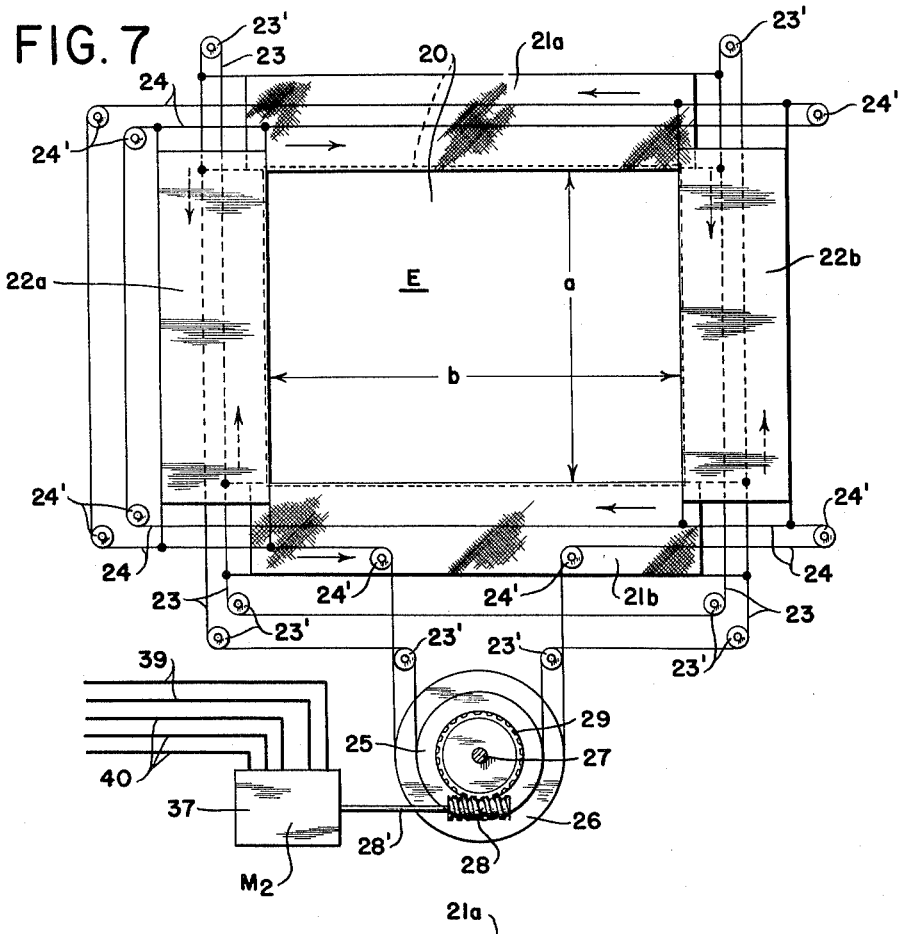
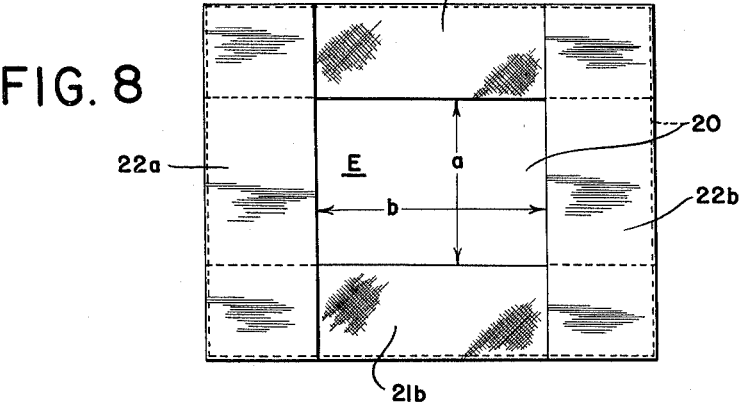
INVENTOR.
Robert Whittle Dowling
BY
Pennie, Edmonds, Morton, Barrows and Taylor
ATTORNEYS March 6, 1956  R. W. DOWLING  2,737,081
PICTURE PROJECTION SYSTEM FOR PROJECTING MOTION PICTURES
Filed Feb. 2, 1954  5 Sheets-Sheet 5
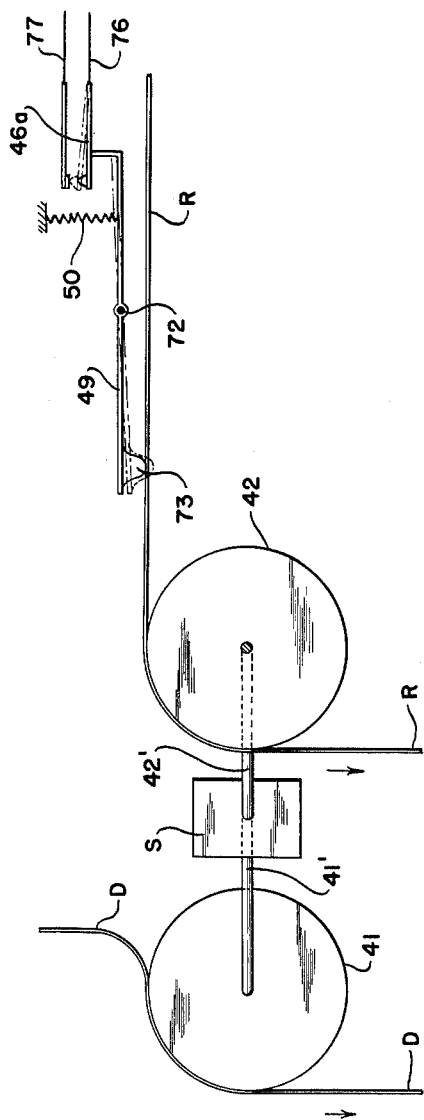
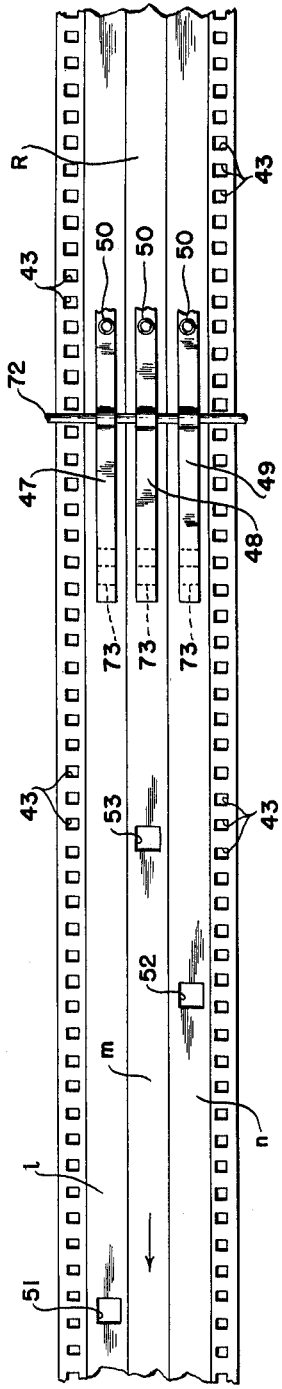
INVENTOR.
Robert Whittle Dowling
BY
Pennie, Edmonds, Morton, Barrows and Taylor
ATTORNEYS

United States Patent Office 2,737,081
Patented Mar. 6, 1956

2,737,081

PICTURE PROJECTION SYSTEM FOR PROJECTING MOTION PICTURES

Robert W. Dowling, New York, N. Y.

Application February 2, 1954, Serial No. 407,719

Claims priority, application France August 27, 1953

19 Claims. (Cl. 88—24)

This invention relates to improvements in installations for the projection of motion-pictures.

Prior to the making of the present invention, when it was desired to project pictures of greater dimensions than normal on a screen, it was necessary to load onto a special projector the entire reel of film, the pictures of which it was intended to enlarge, which process lacked flexibility. Furthermore, this special projector had to be equipped with a special objective and a special lighting device so that, instead of having only two projectors as in the standard projection installations, it was necessary to have available in addition a third projector constituting a very costly apparatus which was operated only occasionally.

The primary object of the invention is to eliminate the foregoing drawbacks and to provide a relatively simple automatic installation by which pictures of varying dimensions may be readily projected.

In general the improved installation or system for the projection of motion pictures includes means operable in the course of the projection of the film, for varying simultaneously and in agreement the useful dimensions of the screen as well as the dimensions of the images or pictures projected on the screen, the dimensions of the pictures being varied, for example by adjusting the focal length of the objective of the projector, while maintaining the focus on the screen. The system also preferably includes means coupled with the preceding variable means for varying the light intensity on the screen in such a way that the brightness of the pictures appears practically constant regardless of the dimensions at which they are projected, all of said variable means preferably being responsive to the operation of the foregoing projector.

In addition to the general combination of elements the improved projection installation comprises certain other arrangements which are preferably used at the same time, but which, if necessary, could be used separately and which will be discussed more in detail hereinafter.

The invention is concerned more particularly with a certain mode of application, as well as certain ways of carrying it out, and it is concerned furthermore particularly with new industrial products, the installations of the kind in question including the application of these same arrangements, as well as the special elements suitable for establishing them, particularly with an objective with variable focus and with projection screens of variable surface.

The invention will be readily understood by means of the following more detailed description, taken in conjunction with the attached drawings, which description and drawings, it is to be understood, are provided for purposes of illustration and example.

In the drawings:

Fig. 1 of the drawings represents schematically and diagrammatically an installation for the projection of motion pictures according to the invention;

Figs. 3 and 4 are views which represent an objective with variable focus set up according to the invention, respectively, in a schematic view and in longitudinal section;

Figure 1:
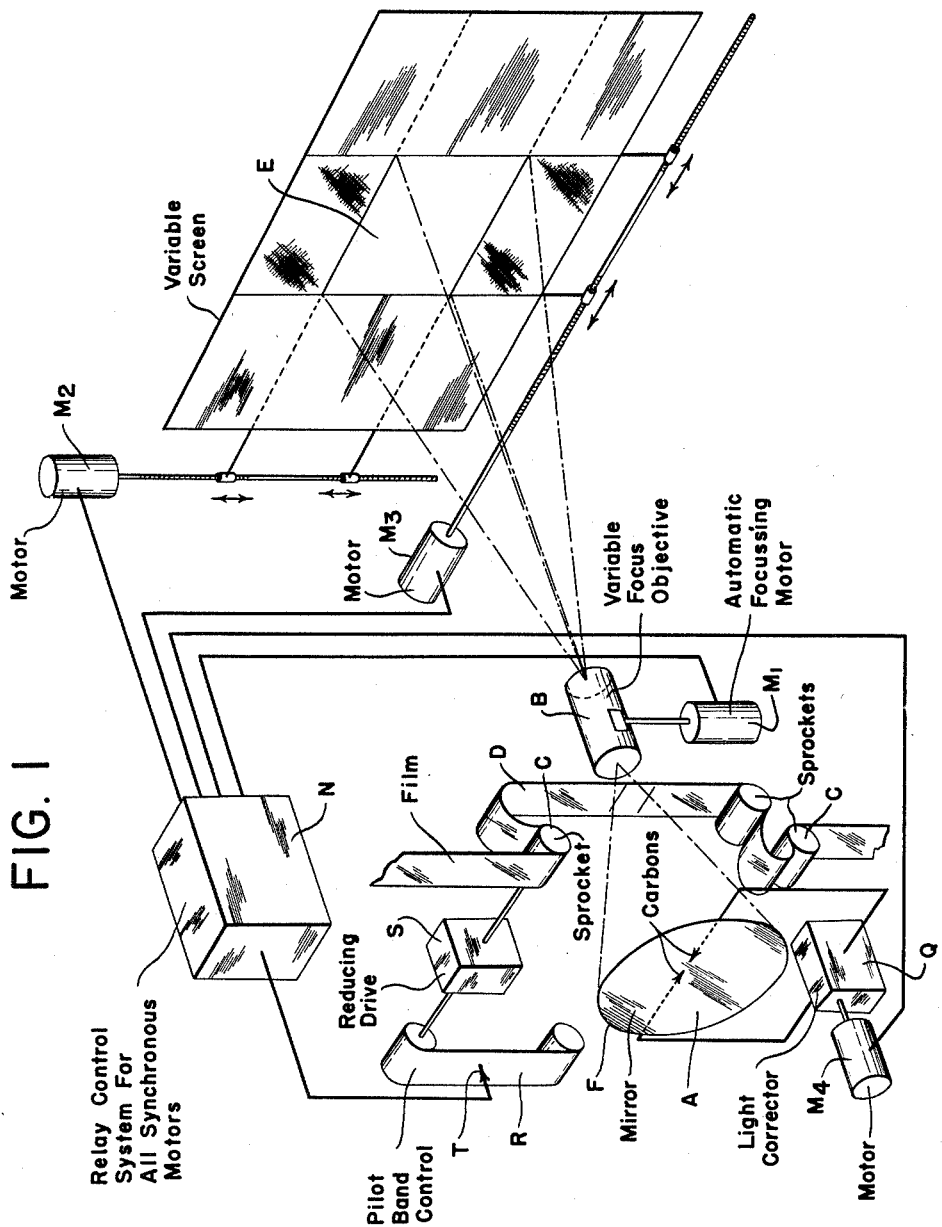
Figure 2:
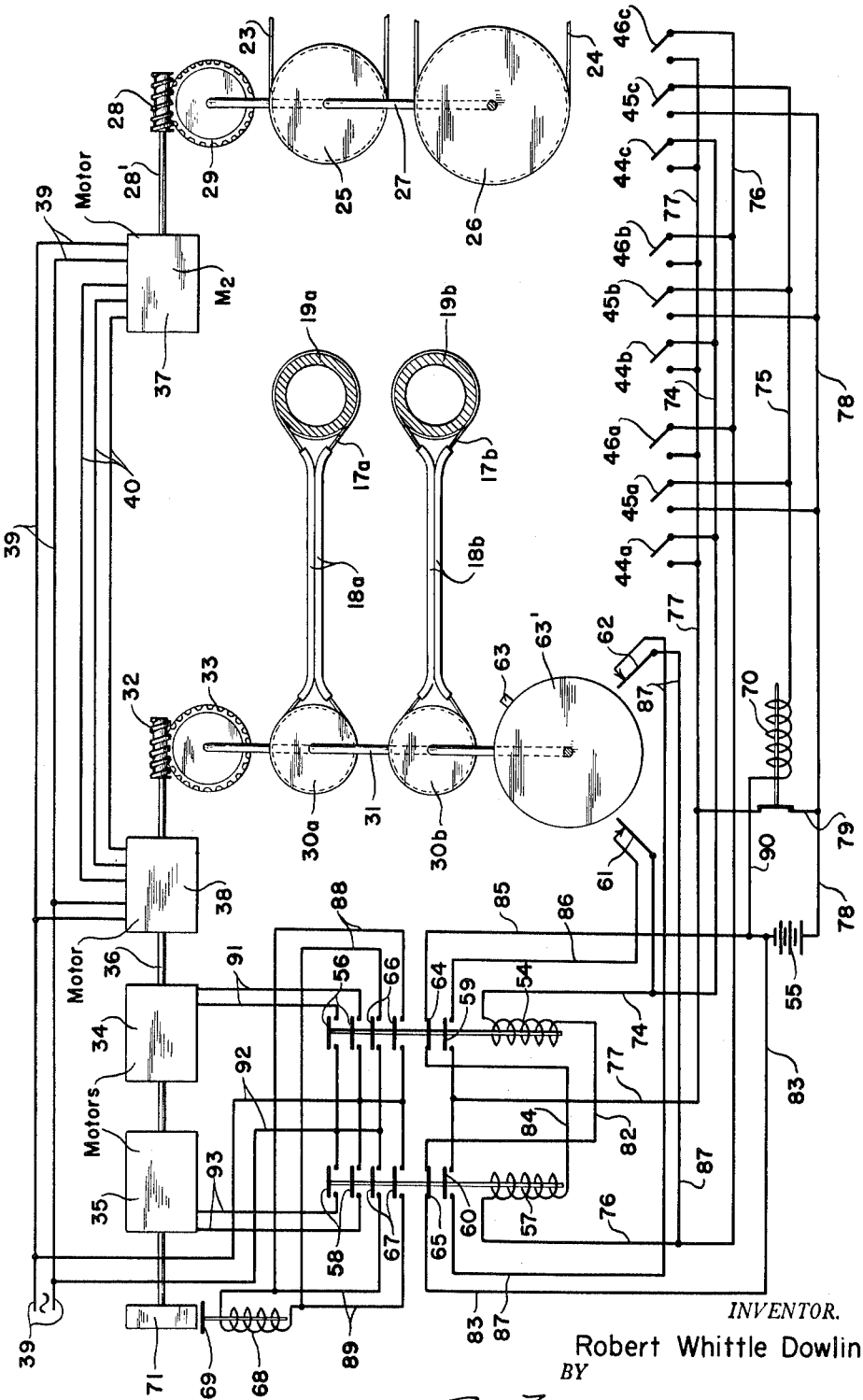
Fig. 2 is a diagrammatic view which represents schematically the control system and electrical wiring arrangement of the installation of Fig. 1.

Figs. 5 and 6 each represent a detail of the objective shown in Fig. 4, respectively, in unfolded plan view and in section on line 6—6;

Fig. 7 is an elevational view of the variable screen shown in Fig. 1, in position of maximum dimensions and area, and its operating mechanism, parts of which are shown diagrammatically;

Fig. 8 is a diagrammatic view showing the screen of Fig. 7 in position of minimum dimensions and area; and Figs. 9 and 10 are enlarged broken detail views, with parts removed, of elements shown in Figs. 1 and 2.

According to the invention and, more particularly, according to that of its modes of application, as well as according to those of the modes of realization of its various parts, to which, it seems, should be given preference, when getting ready to install a system for motion-picture projection, one proceeds as follows or in a similar manner.

First of all, regarding the installation as a whole, it should comprise at least one projector or projection group (but, preferably, two such groups) comprised essentially, as shown schematically in Fig. 1 of a source of light A, for example, a carbon arc lamp equipped with a mirror F as indicated, an objective B, a device or devices C suitable to pass a picture film D between the source of light A and the objective B, and a projection screen E located at a practically fixed position from the objective B.

According to the invention, there are added to the above elements means capable of changing continuously, during the projection of the film D, simultaneously and in coincidence, the useful dimensions of the screen, as well as the dimensions of the pictures projected on the latter, for example means is provided for changing the focal length of the objective B so as to modify its enlargement, while, naturally, maintaining the focus on the screen. For this purpose, a control system N is provided, comprising an electrical relay system commanding all synchronous motors of the installation, which acts on a servomotor, shown schematically at $M_1$, which in turn acts on the optical system of the objective B, and one or more servomotors shown schematically at $M_2$ and $M_3$ capable of increasing or decreasing the useful height and width of the screen, while maintaining these dimensions in a practically fixed relation, the control system N being such that the picture projected and focused on the screen at any moment coincides with the useful zone or area of the screen both in position and dimensions. The center of the screen should preferably be fixed, but the invention does not exclude the provision of additional servomotors, likewise subjected to the control system N, in order correspondingly to change the inclination of the projector and the centering of the useful zone or area of the screen.

The installation advantageously includes means coupled to the control N for varying the luminous flux or intensity or brightness of the light projected onto the screen in such a way that the illumination of each picture appears practically constant regardless of the dimensions given to it on the screen. By way of example, these means are represented schematically by a servomotor $M_4$, subjected to the control system N and acting on an apparatus Q capable of reducing the light intensity of the source A, when the dimensions of the picture on the screen are reduced and vice-versa.

The simultaneous variations in the dimensions of the screen and the picture should be effected at definite moments of the projection, because certain scenes must be projected in large dimensions, others in small dimensions, and again others in intermediate dimensions, depending on the program set up in advance, in order to give the best possible artistic effect.

For this purpose, it may be left to the operator to handle the control system N according to the particular program set up, but it is preferable and more advantageous to operate the control system N automatically in synchronism with the unwinding of the film. To this end, either the film D itself, or, preferably, an auxiliary or pilot strip R driven in synchronism with the film D through a speed-reducing gear S, carries marks or signals, which, when explored or picked up by a suitable sensing system T, are capable of connecting the control system N for operation of the various motors in the desired direction. These marks or signals may be formed either by a photographic track having successive zones of different opacities, this track then being explored by a light beam acting on a photo-electric cell, or preferably by different notches or slots or by their mutual arrangement in the longitudinal direction of the film D or of the band or strip R or by placing them in the transverse direction, these notches or slots then being explored by a light beam and the photo-electric cell or by one or several movable fingers which establish electric contacts at the moment where the slots pass before them. The current impulses thus produced act on the control servomotors shown in Fig. 1 through a system of relays in the control system N.

In the most general case, where the projection installation includes two, or more than two, projectors or projection groups A—B—C, which operate alternately, it is sufficient to provide a single control system N acting on the servomotors $M_1$ (and possibly $M_4$) associated with each objective B, as well as on the servomotors $M_2$ and $M_3$ associated with the screen E, the latter servomotors remaining the same regardless of the projection group in operation. In the case of automatic action, the control system N is so actuated as to respond at any case to the sensing system, such as T which is sensitive to the marks or signals carried by the film D, which passes through the projection group under consideration, or to the pilot strip R operatively associated with the driving means for said film D.

Although the arrangements and operations which have just been described may be carried out in numerous ways, the preferred and advantageous mode of realization, such as that shown in the drawings, is described hereinafter.

As regards the objective B with variable focus, it is formed by a group of fixed lenses and by a group of lenses movable both with respect to the fixed lenses and with respect to each other, the movements of these lenses being mechanically connected so as to change the dimensions of the projected picture of the film, while maintaining said picture in focus on the screen.

For this purpose, there may be thought of a large number of solutions, but the most advantageous solution found is to associate an afocal system of variable enlargement with a normal objective of constant enlargement. This afocal system does not change focusing or the aperture of the ordinary and associated objective, provided that its lenses are of sufficient dimensions for allowing the entire light beam coming from the objective to pass through regardless of the enlargement.

As shown schematically in Fig. 3, the optical system of an objective with variable focus is formed of an ordinary objective having, for instance, two converging lenses 1 and 2 and by an afocal system having a converging lens 4 located between two diverging lenses 3 and 5. The lenses 3, 4, 5 of the afocal system are preferably achromatized separately, as shown.

The ordinary objective comprising lenses 1 and 2 produces pictures from the film D to infinity. The diverging lens 3 than gives a virtual picture at its focus $F_3^1$; the converging lens 4 then gives a picture at the conjugated point of $F_3^1$. In order to make the system of lenses 3, 4 and 5 afocal, the lens 5 is so placed that its focus $F_5$ coincides with the preceding picture, i. e., that it gives to the latter a picture at infinity. A slight displacement of the lens 5 serves to transfer the latter picture at infinity to the screen E, which is at a great distance.

Now, the lenses 1, 2 and 3 are fixed and the lenses 4 and 5 are made mobile so as to vary the enlargement of the unit formed by the ordinary objective 1—2 to any extent by the afocal system 3—4—5, which forms an objective of variable focus, while so connecting the lenses 4 and 5 mechanically as to keep the picture on the screen, as indicated above.

For this purpose, according to the construction shown in Fig. 4, the lenses 1 and 2 which form the ordinary objective, and the lens 3, are fixed in a mounting 6, in the spaced relation shown, while the mounting 6 itself is attached to a cylindrical tube 7. The lenses 4 and 5 are attached respectively in mountings 8 and 9 and said mountings are slidingly and rotatively located in the tube 7. The mountings 8 and 9 are so arranged that the part of the mounting 9 carrying the lens 5 is capable of fitting into mounting 8 and thus to permit the lenses 4 and 5 to be in contact with one aonther. The mountings 8 and 9 are equipped with lugs 10 and 11, respectively, which extend through a longitudinal slot 12 in tube 7, and terminate, respectively, in the helicoidal guide slots 13 and 14 provided in an outer tube 15 coaxial to the tube 7 and capable of rotation without being displaced longitudinally with respect to the latter. Ball thrust bearings 16 are placed between the two tubes 7 and 15 at the ends. The tube 15 is turned or rotated around the tube 7, for example, by means of a metal cable or push-pull wire 17 extending through protective tubes 18 and around a drum 19 which is fixed to and forms a unit with the tube 15, the cable or wire 17 being attached at a point 80 to the drum 19 for avoiding any slipping (see especially Fig. 6), when the cable 17 is driven in the manner shown in Fig. 2 by one of the drums 30a and 30b. By this means it will be understood that it is possible to impress on the lenses 4 and 5 displacements which correspond to the above-indicated conditions for a suitable tracing of the slots 13 and 14.

The characteristics of the slots 13 and 14 may be determined either by computation, or by measurements on an optical bench.

For the calculation, one may proceed by counting the distances positively in the direction of propagation of the light and starting from the points marked at the optical centers $O_1$ to $O_5$ (Fig. 3) of the corresponding lenses. Let us call $f_3$, $f_4$, $f_5$ the focal distances or lengths of the lenses 3, 4 and 5, respectively, $d_1$ the distance between $O_3$ and $O_4$ and $d_2$ the distance between $O_4$ and $O_5$. We will express the enlargement G of the system with respect to the picture given by the objective 1—2 in two different ways.

$$G = \frac{1}{f_4} \times \frac{f_3}{f_5}(d_1 - f_3 - f_4) = f_4 \frac{f_3}{f_5} \frac{1}{d_2 - f_5 - f_4} \quad (1)$$

From the relationship expressed in the Formula 1 it is possible to derive, as a function of $d_1$, the value to be given to $d_1 + d_2$, i. e., as a function of the distance from the lug 10 to a fixed transverse plane, and the distance from the lug 11 to the same transverse plane. The form to be given to the slots is derived therefrom. If the slot 13 is given a helical form, for example, such that, if the tube 15 is unwrapped on a plane or folded out flat, as shown in Fig. 5, the slot 13 would have a straight-line path, and the slot 14 would have the form of a hyperbolic arc.

It will be noted that the enlargement G which, according to the Formula 1 is, except for one constant, proportional to the value of $d_1$, and is likewise, with the exception of a constant, proportional to the relative angle of orientation of the tubes 15 and 7, in the case where the slot 13 is helical.

In making the measurements on the optical bench, the lens 4 is given a marked position, and the position of the lens 5, which projects the picture on the screen E, is sought. If, as before, we have the form of the slot 13, we get point by point that of the slot 14.

In any case the characteristics of the tube 15 can be readily worked out by starting with a thin flat metal plate, and tracing the slots 13 and 14 by cutting or filing, as shown in Fig. 5, according to the profile determined either by computation, or by the measurements on the optical bench, and by, finally, bending the metal plate to the form of a cylindrical tube.

An objective B with variable focus, such as described above and shown in Figs. 3, 4 and 5, permits the dimensions of the image on the screen to be varied greatly. By way of example, consider the case where the objective is formed by an ordinary classical objective by the lenses 1 and 2 having a focal distance of the order of 100 mm., for instance, and by the afocal system of lenses 3, 4 and 5 which have the following respective focal lengths: $f_3 = +150$ mm., $f_4 = -100$ mm., and $f_5 = +150$ mm.

The lens 4 may be displaced between two positions as limits, as follows:

In contact with the fixed lens 3 where $d_1 = 0$

By replacing the letters in the first part of the Formula 1 by their values it will be seen that the enlargement $G = \frac{1}{2}$; and In contact with the movable lens 5 where $d_2 = 0$ By replacing the letters in the second part of the Formula 1 by their values it will be seen that $G = 2$.

The dimensions of the picture projected may thus be varied in the relation of 1 to 4, which is more than sufficient for the requirements in practice.

Where the installation includes two projection groups or projectors, as is generally the case in projection rooms, there is mounted on each projector an objective B similar to that shown in Fig. 4 and described above, the two objectives being subjected to the same control. In this manner, at the moment of connecting one reel to another, there is no discontinuity in the dimensions of the picture. For this purpose, if the two projectors have their objectives B respond to the rotation of drums 19a and 19b, respectively (Fig. 2), in the manner described for the drum 19 and a single projector, which rotation is obtained by means of cables 17a and 17b operating in sheaths 18a and 18b, respectively, it is only necessary to pass said cables over similar control drums 30a and 30b, respectively, fixed to the same shaft 31 driven by the motor $M_1$ or its equivalent—motors 34 and 35 on a shaft 36 (Fig. 2) through a reducing worm gear 32 fixed on shaft 36 and a toothed wheel 33 fixed to shaft 31.

With respect to the screen E of variable dimensions, its frame or border can be formed, according to a first solution, by masks capable of being displaced parallel to their edges, or, according to a second solution, by a luminous projection of suitable color on the part of the screen which should not receive the picture.

According to the first of these solutions, use is made of an ordinary white screen surface 20 (Fig. 7), preferably of high brightness, of dimensions at least equal to those of the largest picture to be projected. The frame or border of this screen surface 20 is formed by masks or strips of fabric (cloth, velvet, etc., or similar material), preferably dark, gray or black, or of any other color, suitable to border the picture area horizontally and vertically. As shown in Fig. 7 the spaced horizontal strips, 21a and 21b, may be displaced parallel to one another in opposite directions. The same is true with respect to the vertical strips 22a and 22b. These pairs of strips are so connected and interconnected as to maintain a constant relation between the useful height $a$ and the useful width $b$, this relation or ratio $a$ to $b$ being in general practically equal to the ratio 3 to 4.

For this purpose, the pairs of horizontal and vertical strips are attached, preferably for reciprocal motion, respectively to the appropriate strands of two endless cables 23 and 24, respectively, arranged on sets of pulleys 23' and 24' and capable of being moved at speeds proportional to the vertical and horizontal dimensions of the picture area, i. e., e. g., the cables 23 and 24 are, respectively, passed over two pulleys 25 and 26 (Figs. 2 and 7), the diameters of which are in the abovementioned ratio $a/b$ and which are caused to rotate at equal speeds. By attaching the two pulleys 25 and 26 on the same shaft 27, it is thus possible to drive the horizontal and vertical strips or bands with a single motor $M_2$ in the form of a Selsyn receiver motor 37, by means of a reducing worm-gear drive 28, fixed to a motor shaft 28', and a toothed wheel 29 (Figs. 7 and 2) fixed to the shaft 27, instead of using the two motors $M_2$ and $M_3$, as provided in the general arrangement of Fig. 1.

According to the second solution for framing the picture area of the screen by a luminous projection, the screen is preferably provided with double-wall borders (not shown), i. e., an opaque wall on the side of the screen and a translucent and diffusing wall, e. g., of plastic material, on the side toward the projector. Between said walls sources of light of various colors are arranged which are capable of forming horizontal and vertical borders at various positions similar to those assumed by the movable strips 21a, 21b and 22a, 22b described above, the sources of light being controlled by switches actuated by the motor 37.

Now with respect to the means for varying the intensity of the light projected onto the screen, their purpose is to eliminate the following drawback. The objective B with variable focus, as has been described above, has an aperture, as has been said above, which is equal to that of the ordinary objective provided by lenses 1 and 2 associated with the afocal system provided by lenses 3, 4 and 5. The luminous flux or light spread over the picture would thus be constant, and the small pictures would receive much more light than the large ones, which would involve the risk of producing a rather unpleasant effect, if it were not eliminated.

For this purpose, the means for changing the intensity of the light are formed by providing the objective with a diaphragm which is either operated by the motor $M_4$ (Fig. 1) subject to the control system N, or, simpler still, the diaphragm is connected at an angular position to the tube 15 which controls the lenses of the afocal system. A third slot (not shown) can therefore be provided in this tube 15 which receives a lug for operating the diaphragm by means of a suitable gear, so that the diaphragm is operated in synchronism with the objective by the shaft 31.

The means for acting on the intensity of the source of light A for instance, may alternatively comprise a rheostat connected at an angular position to the tube 15 and operated in synchronism therewith.

In any case the law or conditions for the operation of the diaphragm or of the rheostat should be determined by experiment so as best to please the eye of the spectator, who in general demands that the small pictures be illuminated somewhat more intensely than the large pictures.

Finally, when the control system N is started, it is operated so that it controls and operates the motors $M_1$ and $M_2$, and possibly $M_3$, or their equivalent elements, at strictly equal or proportional speeds. Since the angular displacements of the drum 19 or the corresponding drums 19a and 19b, to which the enlargements G are proportional, are proportional to the angular displacements of the pulleys 25 and 26, to which the dimensions of the screen are proportional, there is thus constantly obtained the coincidence of the picture and screen areas, provided, of course, that the coefficients of proportionality, i. e., especially the reduction relations between the screw 32 (or 28) and the toothed wheel 33 (or 29), the diameter of the pulleys 25, 26 and the pitch of the helical slot 13, are carefully determined.

In regard to the speed of the motors $M_1$ and $M_2$, or their equivalent driving means, it has been found that the increase in the dimensions of the picture, hence also the useful dimensions of the screen, should take place at a higher speed than their decrease to please the spectator. For this reason the motors or equivalent driving means are so operated that they rotate faster in one direction than in the other.

According to one exemplary embodiment of the control system N, which is particularly advantageous, the control is provided on the one hand with a main motor means arranged close to the projectors and capable of operating their objectives B, and on the other hand with a motor controlled by the main motor and arranged close to the screen and capable of operating the screen masking means. This arrangement makes it necessary to provide only a single system of relays in the control N which are caused to act on the main motor.

This main motor is preferably located in the box with the relays and the mechanism for the control of the objectives, and it is operated so as to rotate forward at a certain speed and backward at a speed about one-half the forward speed for the purpose indicated above.

In place of one motor with two speeds, it is possible and advantageous to use two motors 34 and 35 (Fig. 2) as the main motor means, which rotate at different speeds and in opposite directions and which are attached to the control shaft 36 carrying the worm gear 32. The pair of motors 34 and 35 correspond to and serve in place of the motor $M_1$ of Fig. 1.

The Selsyn motor 37 is preferably employed as the motor $M_2$ in order to subject the motor $M_2$, which operates the screen masking means, to the main motor 34—35, the motor 37 being operated in the form of a receiver and being fed by a Selsyn generator 38 attached to the shaft 36, as shown in Figs. 2 and 7. At 39 is seen the alternating current feeding circuit of the system and at 40 wires forming the Selsyn synchronization circuit.

Care has to be taken to operate the motors 34, 35 so as to rotate them at a lower speed than the speed for which the Selsyn motor 37 would be able to function as a synchronous motor. By way of example, the synchronous speed of a bipolar Selsyn motor is equal to 3000 to 3600 R. P. M. for an alternating feeding circuit of a frequency equal, respectively, to 50 or 60 cycles per second. Therefore, motors 34, 35 are selected having speeds of rotation distinctly lower than said values, e. g., of the order of 1440 or 1700 R. P. M. for 50 or 60 cycles current respectively for the forward motion (increase in the dimensions) and 720 or 850 R. P. M. for 50 or 60 cycle current, respectively for the backward motion (decrease in dimensions).

Three electric circuits are provided for controlling the motors 34 and 35 to respectively increase the picture, decrease the picture and stop the motors (this latter in order to make possible the projection according to intermediate dimensions), each of the first two circuits having track-limit switches capable of stopping the motors in the two limit positions corresponding to the maximum and minimum dimensions of the picture respectively.

The three above-mentioned electric circuits may be closed, respectively, by means of three contacts or switches operated either manually by means of buttons at the disposition of the operator, or automatically by means of film D or the pilot band R.

In the latter case, the pilot strip or band R for each film or projector advantageously comprises a piece of standard 35 mm. film, as shown in Figs. 9 and 10, which is moved by the projector at a speed proportional to that of the film D, the drive mechanism comprising, for instance, a sprocket wheel 41 (Fig. 9) of the projector over which the film D passes, a reducing gear S, and a sprocket wheel 42 over which the pilot band R passes. The sprocket wheel 41 is coupled to and drives the reducing gear S by an input shaft 41' while the sprocket wheel 42 is driven by an output shaft 42'.

If, for instance, it is desired to move the pilot band R at the rate of one perforation 43 (Fig. 10) per second, there will be used two sprocket wheels 41 and 42 of the same size and a reducing gear S of the ratio 1/96 (with the standard 35 mm. film D moving at the rate of 96 perforations per second). Marks are, of course, provided on the film D and on the strip R to assure their synchronization.

The three control contacts, for each projector, for operating the three motor-control circuits are operated, respectively, by three similar pulsating fingers 47, 48 and 49, shown in plan in Fig. 10 and biased against the pilot band R by springs, such as tension springs 50. Holes or slots are provided in the band R which appear under the fingers as the band moves. The holes, such as 51, 52 and 53, Fig. 10, are distributed across the pilot band in three rows marked *l*, *n*, *m*, corresponding, respectively, to the increase in the picture, to the decrease in the picture and to stopping the increase or decrease in the picture. When a hole moves under a finger, the latter sinks in and closes the corresponding electric control contact. Fig. 9 shows a side view of the finger and control switch arrangement, the fingers 47, 48 and 49 being pivoted on a rod 72 extending crosswise adjacent the band or strip R and supported by suitable means, not shown. Each finger carries a rounded lug 73 which rides on the strip R and permits the finger to rock counterclockwise when it enters a hole, such as 52, as shown by the dot-and-dash line position in Fig. 9. The fingers 47, 48 and 49 respectively operate control contacts 44a, 45a and 46a (Fig. 2) of electric switches in the manner illustrated for the finger 49 in Fig. 9, the contact 46a of which closes a circuit through wires 76 and 77.

If it is desired to obtain the largest picture at a certain moment or part of the film D, a hole 51 is pierced at the corresponding place of the pilot band R passing under the picture-increase finger 47 (row *l*). When the greatest dimension has been reached, the system stops by itself. The same thing happens on picture decrease (hole 52 in the row *n*). If it is desired that the system stop at an intermediate position one pierces a hole 53, which passes under the stop finger 48 (row *m*) at the desired time after a hole 51 or 52 which started the movement, considering that the total length of the run, for instance, in the direction of picture increase is six perforations 43 and twelve perforations in the direction of picture decrease. Actually, for pleasing the eye, the speed of opening of the screen masking means, i. e., the time necessary for passing from the small picture to the large one, must be about six seconds, and the time of closure about twelve seconds.

In the general situation where there are two projectors or projection groups, each having a pilot band moving and sensing mechanism, the exciter circuit for the relays which control the motors is branched in parallel for operation, respectively, by the synchronously operated band for each projector and manually, three switches being provided for each with operable contacts as follows: contacts 44a, 45a and 46a for the first projector, contacts 44b, 45b and 46b for the second projector, and contacts 44c, 45c and 46c for manual operation, all as shown in Fig. 2. The 44, 45 and 46 contacts correspond respectively to picture increase operation, stop operation and picture decrease operation.

Fig. 2 shows by way of example one mode of possible realization of the control relays, 54 and 57, for the motors 34, 35. The picture increase contacts 44a, 44b and 44c are connected by wires 74 and 77 in the feeding and operating circuit of the relay 54 through a source of low-tension current, such as a battery 55, said relay 54 being capable of closing bridging contacts 56 of the exciter circuit 91 of the motor 34 to supply operating current from wires 39 through branch wires 92 connected into four switches of relays 54 and 57. The picture reducing contacts 46a, 46b and 46c are connected by wires 76 and 77 in the feeding and operating circuit of the relay 57 through the source of current 55, said relay 57 being capable of closing bridging contacts 58 of the exciter circuit 93 of the motor 35 to supply operating current from wires 92.

When one of the 44-contacts is closed, current flows from source 55 through wire 78, wire 79 and the normally closed switch of relay 70 therein, wire 77 to the closed 44-contact, wire 74 to the operating coil of relay 54, a wire 82, bridging contacts 65 and a wire 83 to the other side of the current source 55. In a similar manner the closing of one of the 46-contacts causes current to flow from the source 55, through wires 78, 79 and 77, the closed 46-contact, wire 76 to the operating coil of relay 57, a wire 84, bridging contacts 64 and a wire 85 to the other side of the current source 55.

The relays 54 and 57 include maintenance bridging contacts 59 and 60, respectively, parallel to the 44- and 46-control contacts and in series, respectively, with corresponding normally closed track-limit switches 61 and 62, actuated to open position for instance, by a finger 63 projecting from a disc or drum 63' attached to the shaft 31. For example, the contact of switch 61, which corresponds to the largest dimension, is in series with the armature, bridging contacts 59 of the relay 54 which controls the picture and screen increase, and the contact of switch 62 is in series with the armature bridging contacts 60 of the relay 57 which controls the picture and screen decrease.

When the relay 54 is operated it is held by current from source 55 flowing through wires 78, 79, 77, closed bridging contacts 59, a wire 86 containing the switch 61, wire 74 to the operating coil of relay 54, wire 82, bridging contacts 65 and wire 83. The relay 57, when operated is held in a similar manner by current flowing from wire 77 through the closed bridging contacts 60, a wire 87 containing the switch 62, wire 76 to the operating coil of relay 57, wire 84, bridging contacts 64 and wire 85 to the current source 55.

The relays 54 and 57 have the normally closed interrupting bridging contacts 64 and 65, respectively, which are in series with the operating coil of the other relay so that, if one relay is operated, the other is non-operative. The relays 54 and 57 carry a pair of normally open bridging contacts 66 and 67, respectively, capable of feeding current from wires 92 through wires 88 and 89, respectively, to the operating coil 68 of an electric brake shoe 69 acting on a brake drum 71 fixed to the shaft 36 for releasing this brake as soon as one of the motors 34, 35 is fed with current. When the current is cut to the motor 34 or 35 it is also cut to the coil 68 and the brake 69 energetically brakes and stops the shaft 36 and the entire system operated thereby.

The stopping contacts 45a, 45b and 45c act on the relay 70 which controls the bridging contacts of the normally closed switch in wire 79, connected in series in the exciter circuit of the relays 54 and 57 so as to cut the feeding circuit of these relays when one of the contacts 45a, 45b, 45c is closed, current flowing from source 55 through wire 78, the closed 45-contact, wire 75 to the operating coil of the relay 70 and a wire 90 to the other side of the source 55.

Whatever mode of operation, automatic or manual, is used there is obtained as a result an installation for motion picture projection whose operation is as follows.

Assuming, for instance, that the projector is in operation and that a hole or opening 51 (Fig. 10) belonging to row l of a pilot band R has moved under the finger 47 of the corresponding exploring system, the contact 44a or 44b closes during a short period of time and energizes the relay 54 which corresponds to the increase in the dimensions of the picture and screen, which relay is held energized by the armature bridging contacts 59. The motor 34 starts moving actuating the objective and the motor 37 rotates in synchronism actuating the screen masking means. Since the hole 51, in the period corresponding to the six perforations 43 which follow, is not followed by a hole 53 appearing under the contact finger 48, the system stops by itself under the action of the finger 63 which opens the switch 61 and interrupts the flow of current through the armature holding contacts 59 to the operating coil of relay 54, in the position corresponding to the maximum dimensions of the picture and of the screen.

Now assume that a hole or opening 52 belonging to the row n moves under the finger 49. The contact 46a or 46b, corresponding to the reduction in the dimensions of the picture and screen, is closed for a short period of time energizing the relay 57, which causes the rotation of the motor 35 and, together with it, the motor 37 which actuates, respectively, the objective and the screen masking means to reduce the picture and screen dimensions. If the hole 52, during the following 12 seconds, is not followed by a hole 53 appearing under the finger 48, the system stops by itself by the opening of the switch 62 by the finger 63 at the position corresponding to the minimum dimensions of the picture and of the screen.

If, however, the hole 52, at the end of, say, six seconds, i. e., after the passage of six perforations 43, is followed by a hole 53, which appears under the finger 48, the stop contact 45a or 45b closes, which actuates the relay 70 thereby interrupting the flow of current in the holding circuit of relay 57, which includes the armature holding contacts 60. The system then stops at an intermediate position corresponding to the medium dimensions of the picture and of the screen, since the duration of the complete reduction in the dimensions of the picture is twelve seconds. Starting from this position, the system can be actuated subsequently in the sense of increasing or of decreasing in the manner indicated above.

It is to be understood that where the means for varying the light intensity with the variation of the picture and screen dimensions is operated from the objective, as described for one form of construction, the illumination of the pictures on the screen will be varied during the foregoing operations to achieve the optimum lighting effect. The same result is obtained if the motor M4 is operated from the control shaft 36, for example, by using a Selsyn generator and receiver motor system like that used for operating the screen masking means.

As will be understood from the foregoing description, the invention is by no means limited to that mode of application, not to mention those of the modes of realization of its different parts, which have been discussed more particularly; on the contrary, it comprises all variants, particularly that in which the system would be subjected only to a manual control by buttons actuating contacts 44c, 45c and 46c, without the assistance of pilot bands or similar automatic coordinating systems.

What I claim is:

1. In a picture projection system for the projection of motion pictures including a projector for projecting pictures from a film and a screen onto which the pictures are projected, a variable border-forming means for adjusting the useful screen area and dimensions to correspond to the area and dimensions of the pictures being projected thereonto, means for operating the variable screen border-forming means, means for changing the area and dimensions of the pictures projected onto the screen by the projector, means responsive to the operation of the projector and operable in synchronism therewith including signal means indicative of predetermined changes to be made in the dimensions of the pictures to be projected and of the useful dimensions of the screen during the projection of the film, means for sensing said signal means as the film moves through the projector, and means responsive to the sensing means for controlling and synchronizing the means for operating the screen border-forming means and the means for changing the area and dimensions of the projected pictures on the screen to effect said predetermined changes and respectively increase and decrease the useful area and dimensions of the screen in synchronism with the increase and decrease respectively of the area and dimensions of the pictures projected onto the screen by the projector.

2. A picture projection system as claimed in claim 1, in which the means for operating the variable screen border-forming means and the means for changing the dimensions of the projected pictures comprises electric motor means, and the means responsive to the sensing means comprises an electric relay control system for controlling the operation of said motor means, said system being operable by the sensing means for respectively increasing and decreasing the picture and useful screen dimensions and for stopping either the increase or decrease of the picture and useful screen dimensions.

3. A picture projection system as claimed in claim 2, including means responsive to the operation of the motor means for operating said relay control system to stop both the increasing and decreasing operations when the picture and useful screen dimensions reach a predetermined maximum and minimum, respectively.

4. A picture projection system as claimed in claim 1, in which the means responsive to the operation of the projector comprises a band carrying said signal means, driving means for the band having a drive connection with the projector, whereby the band is driven at a speed proportional to that of the film moving through the projector.

5. In a picture projection system for the projection of motion pictures including a projector for projecting pictures from a film and a screen onto which the pictures are projected, means for forming a border of variable inside dimensions for outlining and adjusting the useful screen area and dimensions to correspond to the area and dimensions of the pictures being projected thereonto, means for changing the area and dimensions of the pictures projected onto the screen by the projector, motor means for operating the screen border-forming means and the means for changing the pictures, means operable by and in synchronism with the projector provided with signal means indicative of predetermined changes to be made in the dimensions of the pictures to be projected on the screen during the projection of the film, means for sensing said signal means, an electric control system for controlling the operation of said motor means, said electric system including switches operable by the sensing means to respectively increase and decrease the picture and useful screen dimensions and for stopping either said increase or decrease, and means for synchronizing the increase and decrease respectively of the useful area and dimensions of the screen with the increase and decrease respectively of the area and dimensions of the pictures projected onto the screen by the projector.

6. A picture projection system as claimed in claim 5, in which the electric control system includes a pair of similar relays operable one at a time for energizing the motor means to respectively increase and decrease the picture and useful screen dimensions, a common source of electric current for operating said relays, a holding circuit for each relay, and means responsive to the operation of the stopping switch for opening the holding circuit for either relay when in operation.

7. A picture projection system as claimed in claim 5, including a common reversible driving means driven by the motor means for operating the screen border-forming means and the means for changing the dimensions of the pictures.

8. A picture projection system as claimed in claim 5, including a common reversible driving means driven by the motor means for operating the screen border-forming means and the means for changing the dimensions of the pictures, a Selsyn generator driven by said driving means and located with the motor means, the driving means and the means for changing the dimensions of the pictures being located at a position adjacent the projector, and a Selsyn receiver coupled to the Selsyn generator and located at the remote position of the screen for operating the screen border-forming means.

9. A picture projection system as claimed in claim 5 in which the projector includes an objective having a lens system composed of lenses forming an ordinary objective and lenses forming an afocal objective located in front of the ordinary objective and in alignment therewith, said afocal objective comprising a first diverging lens fixed with respect to the ordinary objective, a converging lens and a second diverging lens arranged in series, and means operable by said motor means for moving said converging lens and said second diverging lens relative to the first diverging lens and to each other in a predetermined relationship for changing the dimensions of the pictures projected onto the screen.

10. A picture projection system as claimed in claim 5, in which the means provided with the signal means comprises a movable band having separate parallel rows of signal means respectively for increase and decrease and stopping either the decrease or increase in picture dimensions, and a separate sensing means for each of said rows of signal means for operating the corresponding switches in the electrical control system.

11. In a picture projection system for the projection of motion pictures including a projector for projecting pictures from a film onto the picture area of a screen, and a screen onto which the pictures are projected, means providing a border of variable inside dimensions surrounding the picture area of the screen, said dimensions corresponding to those of the pictures being projected onto the screen, means acting on said means for changing the effective inside dimensions of the border, means for changing the dimensions and area of the pictures projected onto the screen by the projector, and means for synchronizing the operation of the means for changing the inside dimensions of the border and the means for changing the dimensions and area of the projected pictures on the screen to respectively increase and decrease the inside dimensions of the border and of the picture area of the screen with the increase and decrease respectively of the dimensions and area of the pictures projected onto the picture area of the screen by the projector.

12. A picture projection system as claimed in claim 11, in which the projector includes an objective having a lens system including lenses forming an ordinary objective and lenses forming an afocal objective located in front of the ordinary objective and in alignment therewith, said afocal objective comprising a first diverging lens fixed with respect to the ordinary objective, a converging lens and a second diverging lens arranged in series, said converging lens and said second diverging lens being movable relative to the first diverging lens and to each other for changing the dimensions of the pictures projected onto the screen.

13. In a motion picture projector having an objective for changing the area and dimensions of the pictures projected by the projector, said objective including lenses forming an afocal lens system comprising a fixed diverging lens, a movable converging lens and a movable diverging lens arranged in series in a direction toward the front of the projector, a stationary cylindrical tube surrounding said lenses and to which said fixed diverging lens is mounted, a separate mounting for each of said movable lenses slidably arranged in said tube, said tube being provided with a longitudinal slot, a lug secured to each of the mountings for said movable lenses and extending through said slot, a rotatable cylindrical tube coaxial with and surrounding said stationary tube and having slots respectively receiving said lugs, the slot in said rotatable tube receiving the lug of the movable converging lens having a helical form and the slot in the rotatable tube receiving the lug of the movable diverging lens having the form of a hyperbolic arc diverging with respect to said helical slot, and means for rotating said rotatable cylinder about the stationary cylinder to shift said movable lenses axially with respect to the fixed diverging lens and with respect to each other in a predetermined relationship controlled by the characteristics of the slots in the rotatable cylinder.

14. A picture projection system as claimed in claim 11, in which the means for changing the dimensions and area of the pictures projected on the screen includes a variable objective for the projector, means for changing the focal length of the objective, and means operable during the projection of motion picture film and responsive to the operation of the projector for operating the means for changing the focal length of the objective.

15. A picture projection system as claimed in claim 11, including a varaible light source for the projector, and means operable by the synchronizing means during the projection of motion picture film for increasing and decreasing the intensity of the light projected on the screen from the light source in synchronism with the increase and decrease respectively of the dimensions and area of the pictures projected on the screen.

16. A picture projection system as claimed in claim 11, in which the means acting on the means for changing the effective inside dimensions of the border and the means for changing the dimensions and area of the projected pictures comprises electric motor means, and an electric relay circuit for controlling the operation of said motor means, said circuit being operable during the projection of motion picture film for respectively increasing and decreasing the dimensions and area of the projected pictures and of the effective inside dimensions of the border and for respectively stopping said increasing and decreasing, and switches for operating said relay circuit for respectively effecting said increasing, decreasing and stopping operations.

17. A picture projection system as claimed in claim 11, including means operable during the projection of motion picture film and responsive to the operation of the projector for controlling the operation of the synchronizing means.

18. In a picture projection system for the projection of motion pictures including a projector for projecting pictures from a film, and a screen onto which the pictures are projected, a variable border-forming means for adjusting the useful screen area and dimensions, means for operating the variable screen border-forming means, means for changing the area and dimensions of the pictures projected onto the screen by the projector, signal means carried by the film indicative of predetermined changes to be made in the dimensions of the pictures to be projected and of the useful dimensions of the screen during the projection of the film, means for sensing said signal means as the film moves through the projector, and means responsive to the sensing means for controlling and synchronizing the means for operating the screen border-forming means and the means for changing the area and dimensions of the projected pictures on the screen.

19. A picture projection system for the projection of motion pictures, comprising a projector having a variable objective for projecting pictures from a film, a screen having variable useful dimensions onto which the pictures are projected, means operable in the course of the projection of motion picture film for varying simultaneously and in agreement the useful dimensions of the screen and the dimensions of the pictures projected on the screen, said means including means for adjusting the focal length of the objective of the projector to vary the dimensions of the pictures on the screen, and means for maintaining the pictures in focus on the screen during the adjustment of the focal length of the objective of the projector.

References Cited in the file of this patent

UNITED STATES PATENTS

| Number | Name | Date |
|---|---|---|
| 1,218,979 | Cahill | Mar. 13, 1917 |
| 1,268,472 | Kellum | June 4, 1918 |
| 1,271,929 | Nelson | July 9, 1918 |
| 1,646,855 | Del Riccio | Oct. 25, 1927 |
| 2,042,815 | White | June 2, 1936 |
| 2,136,209 | Finch | Nov. 8, 1938 |
| 2,165,341 | Capstaff et al. | July 11, 1939 |
| 2,204,709 | Straubel et al. | June 18, 1940 |
| 2,475,439 | Waller et al. | July 5, 1949 |
| 2,517,246 | Seitz et al. | Aug. 1, 1950 |
| 2,558,660 | Mullen | June 26, 1951 |
| 2,563,892 | Waller et al. | Aug. 11, 1951 |
| 2,606,476 | Waller et al. | Aug. 12, 1952 |

FOREIGN PATENTS

| Number | Country | Date |
|---|---|---|
| 698,912 | France | Nov. 29, 1930 |